(12) United States Patent
Kim et al.

(10) Patent No.: US 12,278,799 B2
(45) Date of Patent: Apr. 15, 2025

(54) ADDRESS MANAGEMENT METHOD AND SYSTEM FOR APPLICATION IN LISP-BASED DISTRIBUTED CONTAINER VIRTUALIZATION ENVIRONMENT

(71) Applicant: FOUNDATION OF SOONGSIL UNIVERSITY-INDUSTRY COOPERATION, Seoul (KR)

(72) Inventors: Young Han Kim, Seoul (KR); Kyoung Jae Sun, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 17/928,487

(22) PCT Filed: May 17, 2022

(86) PCT No.: PCT/KR2022/007018
§ 371 (c)(1),
(2) Date: Nov. 29, 2022

(87) PCT Pub. No.: WO2023/287002
PCT Pub. Date: Jan. 19, 2023

(65) Prior Publication Data
US 2024/0236034 A1    Jul. 11, 2024

(30) Foreign Application Priority Data
Jul. 14, 2021   (KR) .................. 10-2021-0092012

(51) Int. Cl.
*H04L 61/5007*    (2022.01)
*H04L 61/2503*    (2022.01)

(52) U.S. Cl.
CPC ...... *H04L 61/2503* (2013.01); *H04L 61/5007* (2022.05)

(58) Field of Classification Search
CPC .................. H04L 61/2503; H04L 61/5007
See application file for complete search history.

(56) References Cited

U.S. PATENT DOCUMENTS 10,637,889 B2 *   4/2020  Ermagan ............. H04L 63/0428
11,159,366 B1 *   10/2021 Gawade .............. H04L 41/0895
(Continued)

FOREIGN PATENT DOCUMENTS

| KR | 10-2014-0045180 A | 4/2014 |
| KR | 10-2014-0130957 A | 11/2014 |

OTHER PUBLICATIONS

1st Office Action mailed Aug. 25, 2022 issued to corresponding Korean Patent Application No. 10-2021-0092012.
(Continued)

*Primary Examiner* — Dhairya A Patel
*Assistant Examiner* — Sujana Khakural
(74) *Attorney, Agent, or Firm* — Stein IP, LLC

(57) ABSTRACT

Provided is a method for managing an address for an application of a LISP (Locator ID Separation Protocol) network system in a distributed container-based virtualization environment, and the method comprises detecting, by a service discovery agent of a container platform, generation of an application in a corresponding cluster; querying, by the service discovery agent, a service IP address to be assigned to an application to be generated by transmitting a service name to a central control plane; searching, by the control plane, for a service IP address matching the service name and transmitting the service IP address to the service discovery agent; and transmitting, by the service discovery agent, the service IP address to a manager of the container platform to complete the generation of the application, and mapping the service IP address to a public IP for the generated application to register it in the control plane.

4 Claims, 5 Drawing Sheets

(56) References Cited

U.S. PATENT DOCUMENTS

| | | | | |
|---|---|---|---|---|
| 2016/0173405 | A1* | 6/2016 | Freitas | H04L 61/5007 |
| | | | | 709/213 |
| 2020/0045604 | A1* | 2/2020 | Allan | H04W 36/22 |
| 2021/0243164 | A1* | 8/2021 | Murray | H04L 61/4511 |
| 2022/0210122 | A1* | 6/2022 | Levin | H04L 61/2514 |

OTHER PUBLICATIONS

Yoonseon Han et al., "Design and Implementation of LISP Controller in ONOS", IEEE NetSoft Conference and Workshops(NetSoft), 2016.

* cited by examiner

ADDRESS MANAGEMENT METHOD AND SYSTEM FOR APPLICATION IN LISP-BASED DISTRIBUTED CONTAINER VIRTUALIZATION ENVIRONMENT

CROSS-REFERENCE TO RELATED APPLICATIONS

This application is a national stage of International Application No. PCT/KR2022/007018, filed May 17, 2022, which claims the benefit of Korean Application No. 10-2021-0092012, filed Jul. 14, 2021, in the Korean Intellectual Property Office, the disclosure of which are incorporated herein by reference.

TECHNICAL FIELD

The present disclosure relates to an address management method and system for an application in a LISP-based distributed container virtualization environment.

BACKGROUND ART

Recently, in cloud computing, container-based virtualization is in the spotlight as it replaces the existing hypervisor virtualization technology. Container refers to a modular and isolated computing space or computing environment, that is, an isolated space for running applications. Unlike a hypervisor and a guest operating system (OS), which are basically required for virtualization, a container has a type of packaging all files necessary to run an application except for the operating system. It has the advantage of being lighter and faster than the existing virtual machine.

In a network system in a container-based virtualization platform environment, an IP address for a generated container application is assigned as an internal address. Therefore, in order to access an internal container from an external system, it should be accessed through the representative public IP address of the corresponding platform. Such conventional networking technology has the following limitations when the same application runs simultaneously in a geographically dispersed multi-platform environment.

First, when the application is accessed from the outside, packets destined for different IP addresses should be configured according to geographically different platforms. The destination IP address needs to be changed when connecting to a nearby application for the same application when the terminal moves, and thus session suspension and re-establishment are required.

Second, integrated management in terms of networking for the same application running on multiple virtualization platforms is impossible. In the conventional method, a domain name system (DNS) that provides an IP address for a name of a specific application may be used, but this method also requires an additional function for status monitoring according to a dynamic status change of a virtualization application.

DISCLOSURE

Technical Problem

According to the prior art, a VM-based virtual network function and a container-based virtual network function may be controlled or managed by each platform. However, in the integrated cloud system, there may be a need for virtual network functions based on different bases to be managed and controlled by one integrated platform.

Technical Solution

The method for managing an address for an application of a LISP (Locator ID Separation Protocol) network system in a distributed container-based virtualization environment according to an embodiment of the present invention comprises detecting, by a service discovery agent of a container platform, generation of an application in a corresponding cluster; querying, by the service discovery agent, a service IP address to be assigned to an application to be generated by transmitting a service name to a central control plane; searching, by the control plane, for a service IP address matching the service name and transmitting the service IP address to the service discovery agent; and transmitting, by the service discovery agent, the service IP address to a manager of the container platform to complete the generation of the application, and mapping the service IP address to a public IP for the generated application to register it in the control plane.

In one embodiment, wherein detecting the generation of the application in the corresponding cluster comprises monitoring, by the service discovery agent, generation of an application by a networking manager in the corresponding cluster, and requesting to stop the generation of the application in response to detecting start of the generation of the application.

In one embodiment, wherein searching for the service IP address and transmitting the service IP address to the service discovery agent comprises determining whether there is a cluster IP address mapped to the service name, transmitting, if a cluster IP address mapped to the service name is found, the found cluster IP address to the service discovery agent, and mapping, if there is no cluster IP address mapped to the service name found, a cluster IP address randomly selected in a managed IP address area to the service name, and transmitting the mapped IP address to the service discovery agent.

In one embodiment, wherein mapping the service IP address to the public IP to register it in the control plane comprises mapping, by the control plane, an identifier and a locator using the service IP address as the identifier and the public IP as the locator.

In one embodiment, the method for managing an address for an application of a LISP network system in a distributed container-based virtualization environment further comprises querying, by a first supporting router to which an external terminal belongs, to the control plane for a locator for a packet destined for an identifier, which is an arbitrary service IP; providing, by the control plane, a public IP address mapped to the identifier as a locator to the first supporting router; designating, by the supporting router, a public IP address of the locator as a receiver, and transmitting it to a supporting router of a cluster corresponding to the receiver; and transmitting, by a supporting router of a cluster corresponding to the receiver, the packet to an application corresponding to the service IP.

The network system in a LISP-based distributed container virtualization environment according to other embodiment of the present invention comprises a service discovery agent of a container platform for detecting generation of an application in a corresponding cluster and transmitting a service name of the application to query for a service IP address to be assigned to an application to be generated; and a central control plane for receiving the query, searching for a service IP address matching the service name, and transmitting the service IP address to the service discovery agent, wherein the service discovery agent transmits the received service IP address to a manger of the container platform to complete the generation of the application, and maps the service IP address to a public IP for the generated application to register it in the control plane.

In one embodiment, wherein the service discovery agent monitors generation of an application by a networking manager in a corresponding cluster, and requests to stop the generation of the application in response to detecting start of the generation of the application.

In one embodiment, wherein the control plane determines whether there is a cluster IP address mapped to the service name, transmits, when a cluster IP address mapped to the service name is found, the found cluster IP address to the service discovery agent, and maps, when there is no cluster IP address mapped to the service name found, a cluster IP address randomly selected in a managed IP address area to the service name, and transmits the mapped IP address to the service discovery agent.

In one embodiment, wherein the control plane includes an ID/location mapping unit for mapping an identifier and a locator using the service IP address as the identifier and the public IP as the locator.

In one embodiment, the system of claim further comprises a first supporting router, to which an external terminal transmitting a packet destined for an identifier that is an arbitrary service IP belongs, for querying to the control plane for a locator for the packet, receiving a public IP address mapped to the identifier from the control plane as a locator, and transmitting the packet by designating the public IP address of the locator as a receiver; and a second supporting router in a cluster corresponding to the receiver, wherein the second supporting router transmits the packet to an application corresponding to the service IP.

The control plane in a distributed container-based virtualization environment according to another embodiment of the present invention comprises a service IP manager for mapping and storing a service IP address for a service name; an ID-location mapping unit for mapping and storing the service IP address and a public IP address; and a service discovery controller for, when receiving a query for a service IP address for a service name from a service discovery agent of a container platform, transmitting a service IP address mapped through the service IP manager as a response message.

In one embodiment, wherein the service IP manager, if a service IP address mapped to the service name included in the query is not found, maps an IP address randomly selected from a managed IP address area to the service name, and then transmits the mapped IP address to the service discovery agent as the service IP address.

In one embodiment, wherein the ID-location mapping unit receives a mapping registration message with the service IP address as an identifier and a public IP address as a locator from a supporting router belonging to the same cluster as the service discovery agent, and updates mapping data.

In one embodiment, wherein the service discovery controller, when receiving a query for a public IP address for the service IP address from a supporting router of a cluster including an external terminal transmitting a packet, transmits a response message including a public IP address mapped through the ID-location mapping unit to the supporting router.

Advantageous Effects

According to an embodiment of the present invention, it is possible to assign a service IP address as the same service identifier to the same application operating in a plurality of independent container-based cloud systems, thereby facilitating management of the same application in a distributed cloud platform.

In addition, according to an embodiment of the present invention, when a terminal moves, or when an existing application fails and the connection is changed to the same application in another cloud, the same identifier can be used even when the connection is changed to the application of a different cloud platform according to the application of the LISP-based identifier/locator separation structure, thereby avoiding session restart and making a quick connection.

In addition, in the process of initially searching for and accessing a specific service that operates simultaneously in multiple locations in a distributed cloud environment, it is possible to facilitate the search with a single ID and perform end-to-end connection through the discovered ID information. Accordingly, it is possible to perform fast connection by eliminating the vulnerability for session connectivity support that occurs during the intermediate address translation process and providing connectivity to the same ID even in case of movement or failure.

DESCRIPTION OF DRAWINGS

These and/or other aspects will become apparent and more readily appreciated from the following description of the embodiments, taken in conjunction with the accompanying drawings in which.

DETAILED DESCRIPTION OF EMBODIMENTS

Figure 1:
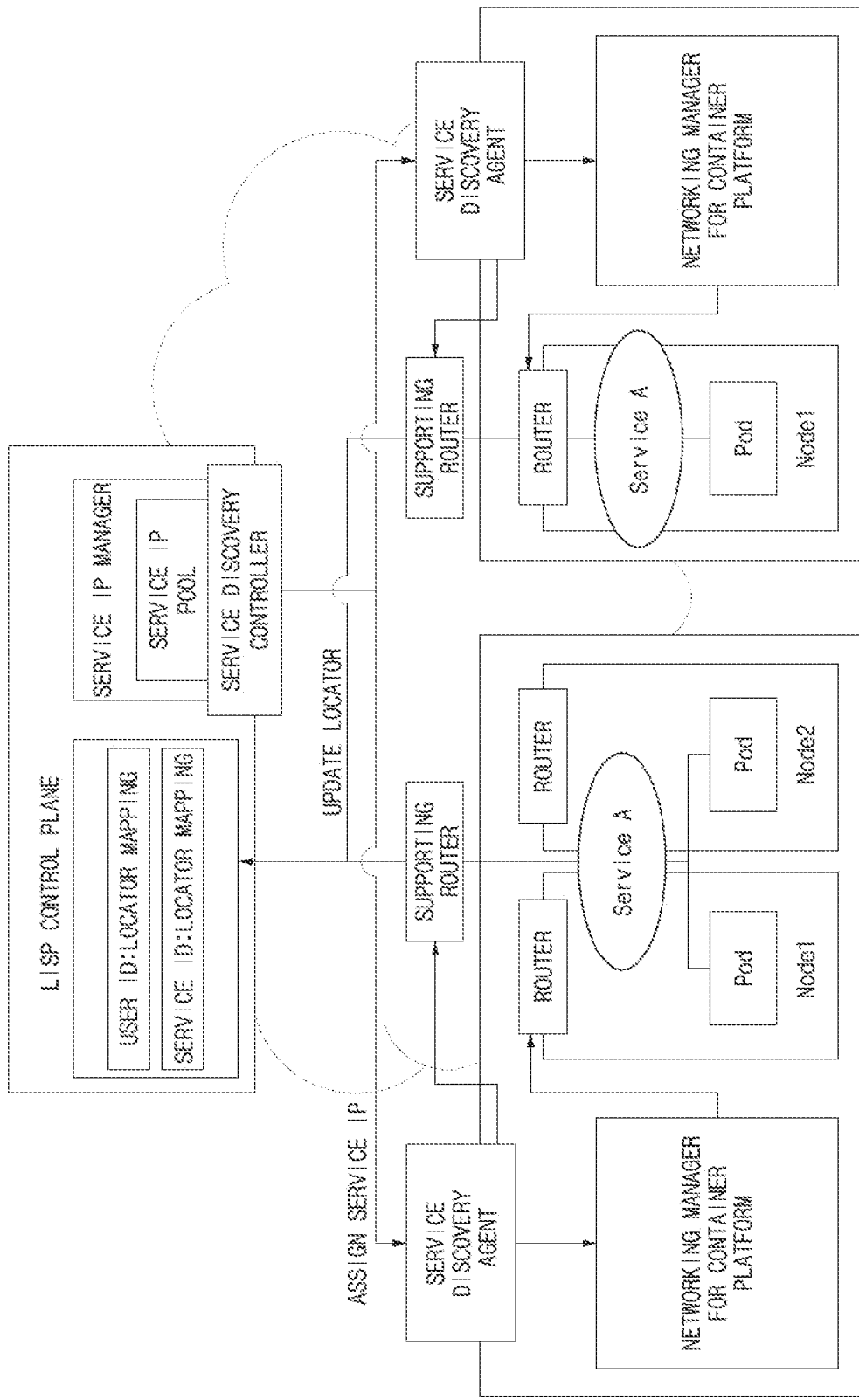
FIG. 1 is a diagram showing the structure of a network system in a LISP-based distributed container virtualization environment according to an embodiment of the present invention.

Since the present invention can have various changes and can have various embodiments, specific embodiments will be described in detail with reference to the drawings. However, this is not intended to limit the present invention to specific embodiments, and should be understood to include all modifications, equivalents and substitutes included in the spirit and scope of the present invention. In describing each figure, like reference numerals are used for like elements.

Terms such as first, second, A, and B may be used to describe various elements, but the elements should not be limited by the terms. The above terms are used only for the purpose of distinguishing one element from another. For example, without departing from the scope of the present invention, the first element may be referred to as the second element, and similarly, the second element may also be referred to as the first element. The term "and/or" includes a combination of a plurality of related description items or any of a plurality of related description items.

When an element is referred to as "connected" to another component, it may be directly connected to the other element, but it should be understood that other elements may exist therebetween. On the other hand, when a certain element is referred to as "directly connected" to another element, it should be understood that the other element does not exist therebetween.

The terms used in the present disclosure are only used to describe specific embodiments, and are not intended to limit the present invention. The singular expression includes the plural expression unless the context clearly dictates otherwise. In the present disclosure, terms such as "comprise" or "have" are intended to designate that a feature, number, step, operation, component, part, or combination thereof described in the disclosure exists, but it should be understood that this does not preclude the possibility of addition or presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present invention belongs. Terms such as those defined in a commonly used dictionary should be interpreted as having a meaning consistent with the meaning in the context of the related art, and should not be interpreted in an ideal or excessively formal meaning unless explicitly defined in the present disclosure.

Throughout the disclosure and claims, when a part includes a certain element, it means that other elements may be further included, rather than excluding other elements, unless otherwise stated.

Hereinafter, preferred embodiments according to the present invention will be described in detail with reference to the accompanying drawings.

LISP (Locator ID Separation Protocol) is a protocol that separates locators and identifiers. In LISP, network components (such as routers) map and search end identifiers (EIDs) and routing location information (RLOCs).

In the present disclosure, the control plane is a component that controls how a datagram is transmitted between routers from a sending host to a destination host, as well as how to set and manage network layer components and services.

Figure 2:
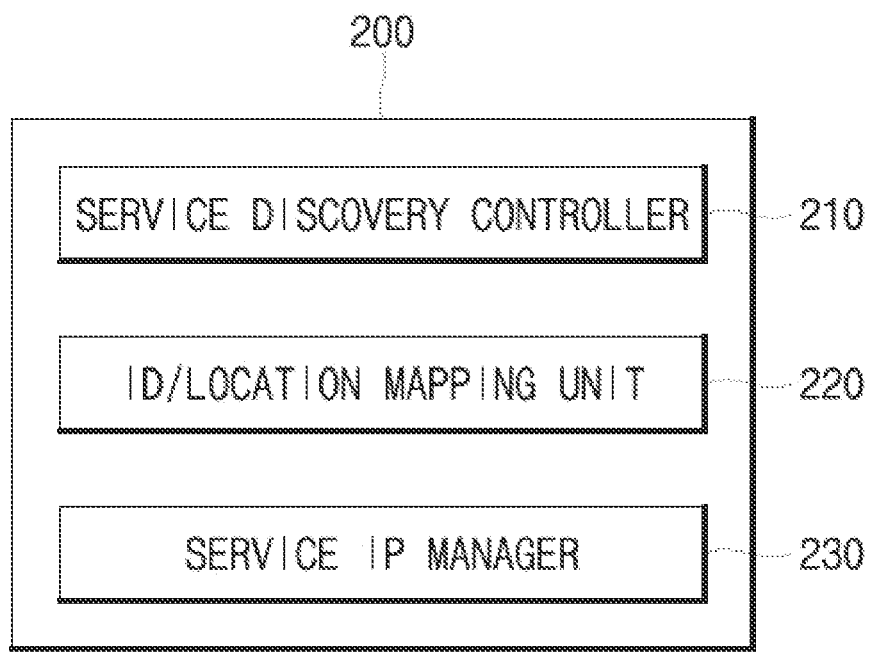
FIG. 2 is a block diagram showing the structure of a control plane according to an embodiment of the present invention.

FIG. 1 is a diagram showing the structure of a network system in a LISP-based distributed container virtualization environment according to an embodiment of the present invention, and FIG. 2 is a block diagram showing the structure of a control plane according to an embodiment of the present invention.

The LISP-based distributed container virtualization environment assumes that a plurality of nodes included in a plurality of clusters are operated. And at least one Pod is included in the node.

Here, the cluster refers to the virtualization of several servers making it looked like as one server, and may be located in each region. Specifically, the distributed container-based virtualization environment of FIG. 1 includes ClusterA and ClusterB, and ClusterA may be located in area a and ClusterB may be located in area b.

Also, it can be seen that one cluster includes a plurality of nodes. A node represents a server unit, in which an actual service (or container) is executed. A node plays a role in generating a service and managing the service state, and consists of a plurality of Pods.

In a LISP-based distributed container virtualization environment, the control plane performs integrated service IP address management of each cluster.

When the control plane receives a query for the location of the service ID from the user terminal, it determines an appropriate locator for the equivalent service distributed in various locations and provides it to the user terminal.

The control plane records the degree of mapping between the internal IP address assigned to each application and the public IP address of the corresponding cloud platform. Through this, when an external terminal accesses the same application between different clouds, packet transmission can be performed by changing the locator for packet transmission in the network while maintaining the destination IP address. The control plane will be described in detail with reference to FIG. 2 to be described later.

Each cluster includes an independent networking manager, service discovery agent, and LISP supporting router.

The networking manager performs the function of allocating resources for executing a specific service to a node.

The service discovery agent monitors the networking manager and acquires a service IP address to be assigned to an application from the control plane by performing a query and response of an IP address with the service discovery controller.

When transmitting a packet to different networks, the LISP supporting router transmits a query message including the service IP address of the packet to the control plane, receives a response message including the public IP address, and transmits the packet to the network using the public IP address as the destination of the packet.

Through this, packets can be transmitted through the same destination IP address for the same application in a LISP-based distributed container virtualization environment located in different clusters.

Referring to FIG. 2, the control plane 200 may include a service discovery controller 210, an ID/location mapping unit 220, and a service IP manager 230.

The service discovery controller 210 performs a query and response with the service IP manager who manages the IP address area and the service discovery agent (SDA) of the cluster to be described later so that the same internal IP address can be assigned to the same application.

The ID/location mapping unit 220 maps, stores, and manages the service IP address and the public IP address.

The service IP manager 230 maps, stores, and manages service IP addresses to service names. When the service IP address mapped to the service name included in the query received through the service discovery controller 210 is not found, the service IP manager 230 maps an IP address randomly selected from the managed IP address area to the service name, and transmits the mapped IP address to the service discovery agent as the service IP address.

When receiving a query for a service IP address for a service name from the service discovery agent of the container platform, the service discovery controller 210 transmits a service IP address mapped through the service IP manager as a response message.

Figure 3:
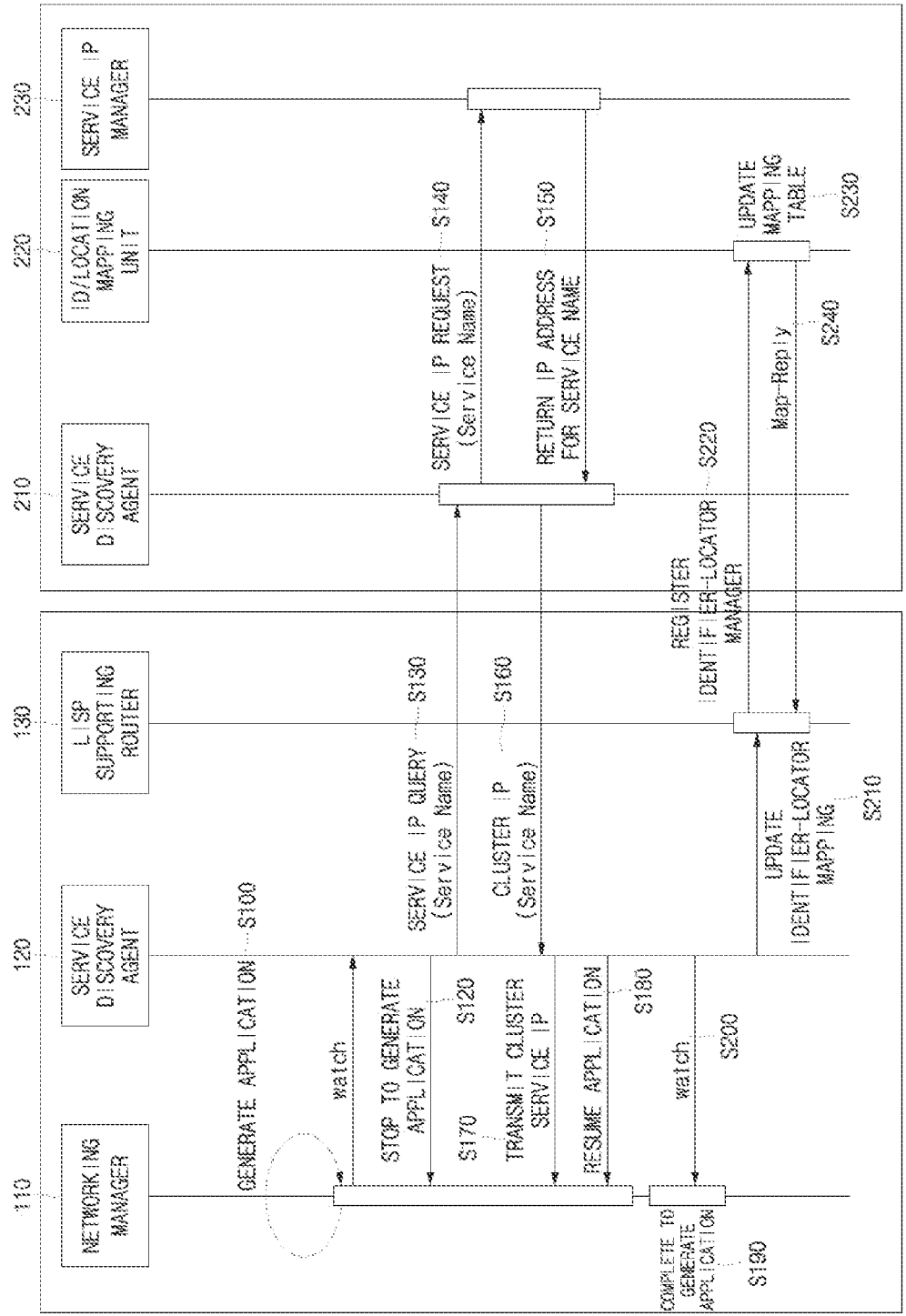
FIG. 3 is a flowchart illustrating a message exchange procedure of a control plane according to an embodiment of the present invention.

FIG. 3 is a flowchart illustrating a message exchange procedure of a control plane according to an embodiment of the present invention. According to an embodiment, the message exchange procedure of the control plane shown in FIG. 3 may be performed by the network system in the LISP-based distributed container virtualization environment shown in FIGS. 1 and 2.

According to an embodiment, the networking manager 110, the service discovery agent 120, and the LISP supporting router 130 shown in FIG. 3 may be components included in the container platform, and the service discovery controller 210, the ID/location mapping unit 220 and the service IP manager 230 may be components included in the control plane.

Referring to FIG. 3, when the networking manager 110 in the container platform generates an application (S110), the service discovery agent 120 detects this and has the networking manager 110 temporarily suspend the generation of the application (S120). Thereafter, the service discovery agent 120 transmits the Service Name of the application to be generated to the service discovery controller 210 of the central control plane 200 to query an IP address to be assigned to the application (S130).

When receiving a query, the service discovery controller 210 of the control plane 200 transmits the service name for the application to be generated to the service IP manager 230 (S140).

The service IP manager 230 returns the IP address for the Service Name to the service discovery controller 210 (S150).

More specifically, the service IP manager 230 determines whether there is a previously assigned Cluster IP address with the Service Name transmitted from the list consisting of [Service Name: ClusterIP], and if there is an IP address already assigned to the Service Name, the service IP manager 230 returns the previously assigned IP address to the service discovery controller 210. If there is no previously assigned IP to the received Service Name, the service IP manager 230 randomly selects one from the IP address area managed by the corresponding function, records it as an IP for the Service Name of the application to be generated, and returns the corresponding IP to the service discovery controller 210.

The service discovery controller 210 transmits the returned IP address as a response message to the query of the service discovery agent 120 to the service discovery agent 120 of the container platform (S160).

The service discovery agent 120 transmits the IP address information in the response message to the networking manager 110 (S170) to resume the application generation (S180).

The networking manager 110 updates the IP address information in the response message as the configuration information for the corresponding application and resumes the process of generating the corresponding application such that the assigned IP address is used during the network configuration of the application (S190).

The service discovery agent 120 monitors the networking manager 110 (S200) to detect an event, in which the generation of the requested application is completed, and commands the LISP supporting router 130 in the corresponding cloud platform to update the identifier-locator mapping information for the application (S210).

The LISP supporting router 130 receiving the command generates a LISP mapping registration message using the service IP of the corresponding application as an identifier and its own public IP address as the locator, and transmits it to the service ID/location mapping unit 220 of the control plane (S220) to update the ID/location mapping table (S230). Accordingly, when the LISP supporting router 130 requests a locator for the corresponding identifier (S240), the ID/location mapping unit 220 can return the public IP address of the cloud platform where the application is generated to the LISP supporting router 130.

Figure 4:
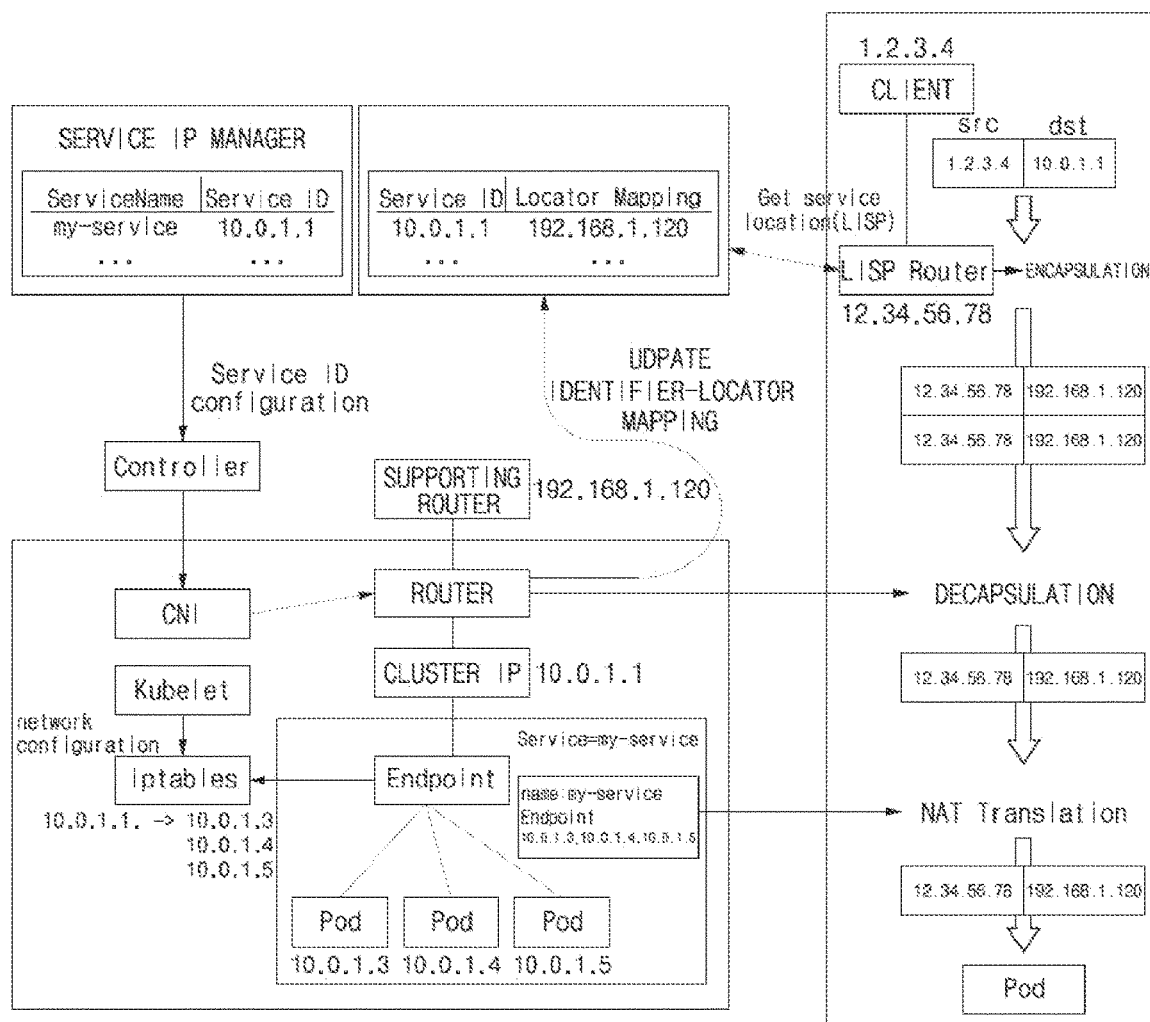
FIG. 4 is a conceptual diagram for describing an application access procedure of an external terminal according to an embodiment of the present invention.
Figure 5:
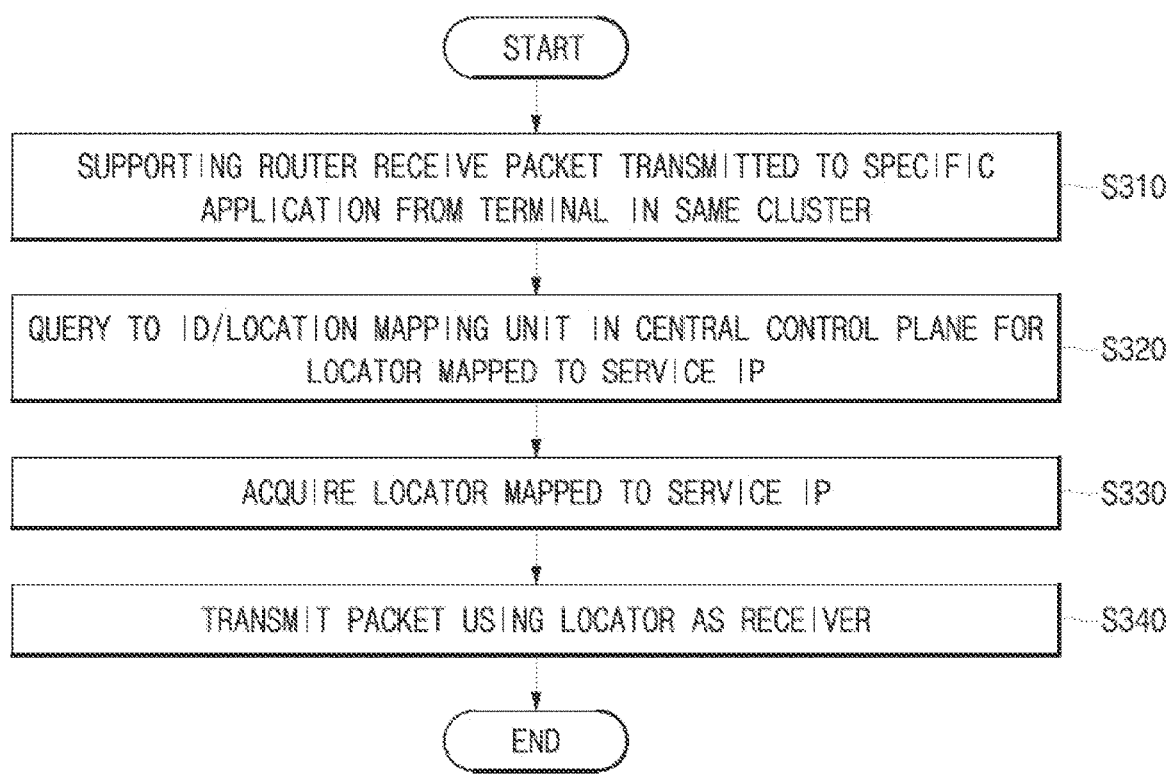
FIG. 5 is a flowchart illustrating an application access procedure of an external terminal according to an embodiment of the present invention.

FIG. 4 is a conceptual diagram illustrating an application access procedure of an external terminal according to an embodiment of the present invention, and FIG. 5 is a flowchart illustrating an application access procedure of an external terminal according to an embodiment of the present invention. According to an embodiment, the application access procedure of the external terminal shown in FIGS. 3 and 4 may be performed by the network system in the distributed container-based virtualization environment shown in FIGS. 1 and 2.

Referring now to FIG. 4, an IP address in the LIST is divided into two addresses, an endpoint ID (EID) and a routing locator (RLOC).

The EID is defined as a unique IP address assigned to an endpoint node, is used to establish an end-to-end connection between two nodes, and is an address written into the source and destination address fields located within the header of the packet. The RLOC is the address of the export router. IP packets between two EIDs are encapsulated and transmitted between LISP routers called xTRs (ingress/egress tunneling routers), to which EIDs are connected, using RLOC, which is the address of each LISP router. When an EID is connected to a LISP network, it is mapped with the RLOC of the corresponding LISP router, and this mapping information is managed by a logically centralized LISP mapping system. In the LISP standard document, the control plane message between the LISP mapping system and the LISP router is defined to update and query the EID-RLOC mapping, LISP-based ID/location separation can provide more effective and basic support for mobility management than traditional IP-based infrastructures.

When considering a LISP-based distributed cloud design, the first thing to do is to define the ID and locator of the container service. Since the IP address of the Pod is non-persistent according to dynamic management, the immutability of the service ID required by the identifier in the LISP cannot be guaranteed. Therefore, the IP address of the Pod is not suitable for the service ID.

Instead, it is appropriate to define the cluster IP as the service ID, which is the IP address assigned to the service object. The static IP access can be provided to Pods that are defined as the same service. Therefore, the cluster IP address pool management, which was managed independently in each cluster, should be moved to the centralized LISP control plane. For cluster IP management, the newly defined service IP manager assigns an IP address to the service name upon service generation. Within the cluster IP address pool, IP addresses of services can be predefined or dynamically assigned according to policy.

Referring to FIG. 5, an external terminal (client) transmits a packet destined for an identifier for a specific application, that is, a service IP address, into the network (S300), and the LISP router of the network accessed by the external terminal receives the packet (S310), and queries to the ID/location mapping unit in the central control plane system for a locator for the corresponding IP address (S320). The ID/location mapping unit may select an IP address most suitable for the current terminal from among a plurality of locator IPs mapped to the corresponding service IP address, and respond to the LISP router of the terminal with it as a mapping response message (S330). The LISP router on the terminal side receiving this packet generates an IP header, in which the locator of the terminal, that is, the public IP address of the LISP router, and locator of the application, that is, the locator IP address mapped to the service IP received through the LISP mapping system are designated as a sender and a receiver, and encapsulates it in the packet, and then transmit it to the network (S340). The transmitted packet is transmitted to the LISP router of the cloud platform where the application with the receiver IP operates. The LISP router in the cloud platform receiving the packet removes the external header of the packet (S360), and transmits this packet destined for the service IP address to the inside of the cloud system. In the cloud system, packets can be transmitted to the application according to the internal networking management rules for the corresponding destination IP address. Through this, when accessing the same application in another cloud system due to the movement of the terminal, if the terminal transmits a packet through the same destination IP address, the packet can be transmitted through locator update between LISP routers in the network without a separate session restart process.

The above description is merely illustrative of the technical spirit of the present invention, and various modifications and variations will be possible without departing from the essential characteristics of the present invention by those skilled in the art to which the present invention pertains. Therefore, the embodiments disclosed in the present invention are not intended to limit the technical spirit of the present invention, but to illustrate, and the scope of the technical spirit of the present invention is not limited by these embodiments. The protection scope of the present invention should be interpreted by the following claims, and all technical sprit within the scope equivalent thereto should be construed as being included in the scope of the present invention.

The invention claimed is:

1. A method for managing an address for an application of a LISP (Locator ID Separation Protocol) network system in a distributed container-based virtualization environment comprising:
    detecting, by a service discovery agent of a container platform, a generation of an application in a corresponding cluster;
    querying, by the service discovery agent, a service IP address to be assigned to an application to be generated by transmitting a service name to a central control plane;
    searching, by the control plane, for a service IP address matching the service name and transmitting the service IP address to the service discovery agent; and
    transmitting, by the service discovery agent, the service IP address to a manager of the container platform to complete the generation of the application, and mapping the service IP address to a public IP for the generated application to register it in the control plane,
    wherein the application is generated by a node of the corresponding cluster in a LISP-based distributed container virtualization environment including a plurality of clusters,
    wherein the mapping the service IP address to the public IP to register it in the control plane comprises, mapping, by the control plane, an identifier and a locator using the service IP address as the identifier and the public IP as the locator,
    wherein searching for the service IP address and transmitting the service IP address to the service discovery agent comprises,
    determining whether there is a cluster IP address mapped to the service name,
    transmitting, if a cluster IP address mapped to the service name is found, the found cluster IP address to the service discovery agent so that a packet for the service name is transmitted through the cluster IP address in different clusters of the LISP-based distributed container virtualization environment, and
    mapping, if there is no cluster IP address mapped to the service name found, a cluster IP address randomly selected in a managed IP address area to the service name, and transmitting the mapped IP address to the service discovery agent,
    wherein detecting the generation of the application in the corresponding cluster comprises,
    monitoring, by the service discovery agent, generation of an application by a networking manager in the corresponding cluster, and requesting to stop the generation of the application in response to detecting a start of the generation of the application.

2. The method of claim 1 further comprises,
    querying, by a first supporting router to which an external terminal belongs, to the control plane for a locator for a packet destined for an identifier, which is an arbitrary service IP;
    providing, by the control plane, a public IP address mapped to the identifier to the first supporting router as a locator;
    designating, by the supporting router, a public IP address of the locator as a receiver, and transmitting it to a supporting router of a cluster corresponding to the receiver; and
    transmitting, by the supporting router of the cluster corresponding to the receiver, the packet to an application corresponding to the service IP.

3. A network system in a LISP-based distributed container virtualization environment comprising:
    at least one hardware processor; and
    a non-transitory computer-readable storage medium storing instructions which, when executed by the at least one hardware processor, are configured to perform operations comprising:
    detecting, a service discovery agent of a container platform, generation of an application in a corresponding cluster and transmitting a service name of the application to query for a service IP address to be assigned to an application to be generated; and
    receiving, by the central control plane, the query, searching for a service IP address matching the service name, and transmitting the service IP address to the service discovery agent,
    wherein the application is generated by a node of the corresponding cluster in a LISP-based distributed container virtualization environment including a plurality of clusters,
    wherein the service discovery agent transmits the service IP address to a manger of the container platform to complete the generation of the application, and maps the service IP address to a public IP for the generated application to register it in the control plane,
    wherein the control plane includes an ID/location mapping unit for mapping an identifier and a locator using the service IP address as the identifier and the public IP as the locator,
    wherein the control plane,
    determines whether there is a cluster IP address mapped to the service name,
    transmits, when a cluster IP address mapped to the service name is found, the found cluster IP address to the service discovery agent so that a packet for the service name is transmitted through the cluster IP address in different clusters of the LISP-based distributed container virtualization environment, and
    maps, when there is no cluster IP address mapped to the service name found, a cluster IP address randomly selected in a managed IP address area to the service name, and transmits the mapped IP address to the service discovery agent, wherein the service discovery agent monitors generation of an application by a networking manager in a corresponding cluster, and requests to stop the generation of the application in response to detecting start of the generation of the application.

4. The system of claim 3 further comprises, a first supporting router, to which an external terminal belongs, transmitting a packet destined for an identifier, which is an arbitrary service IP, for querying to the control plane for a locator for the packet, receiving a public IP address mapped to the identifier from the control plane as a locator, and transmitting the packet by designating the public IP address of the locator as a receiver; and a second supporting router in a cluster corresponding to the receiver, wherein the second supporting router transmits the packet to an application corresponding to the service IP.

* * * * *